Inventor
JOHN G. RITTER

United States Patent Office 2,766,626
Patented Oct. 16, 1956

2,766,626
NUTATION DAMPER

John G. Ritter, Springfield, Mass., assignor to the United States of America as represented by the Secretary of the Navy Application December 27, 1945, Serial No. 637,508

1 Claim. (Cl. 74—5.5)

This invention relates to a nutation damper for a vertical gyro.

A neutral gyro mounted in gimbals on mutually perpendicular horizontal axes and spinning on a vertical axis is subject to wobbling about a point in the spin axis. This wobbling, termed nutation, is fairly rapid, and is perpetuated by energy supplied through friction in the bearings. Nutation may be initiated by shock or any other factor which disturbs smooth spin on the axis.

Since nutation may become destructive to the gyro, and is in any event disturbing to the gyro's ability to constitute a stable vertical reference, it must be eliminated for proper operation of the gyro and of the instrument in which it is incorporated.

It is therefore an object of the invention to provide a device capable of damping out nutation of a vertical gyro.

A more specific object of the invention is to provide for absorbing the energy creating nutation by means including a mass of high inertia and a material having high internal friction to be compressed between the mass and a part of the gyro.

Figure 1:
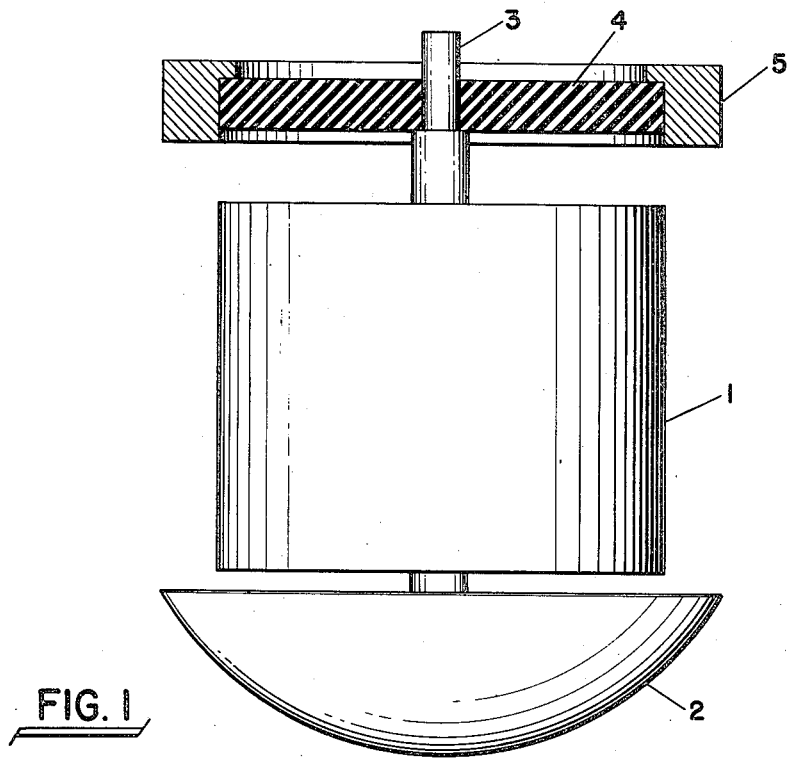
Figure 1 is a diagrammatical view of a vertical gyro with the nutation damper in place, the damper being in section.
Figure 2:
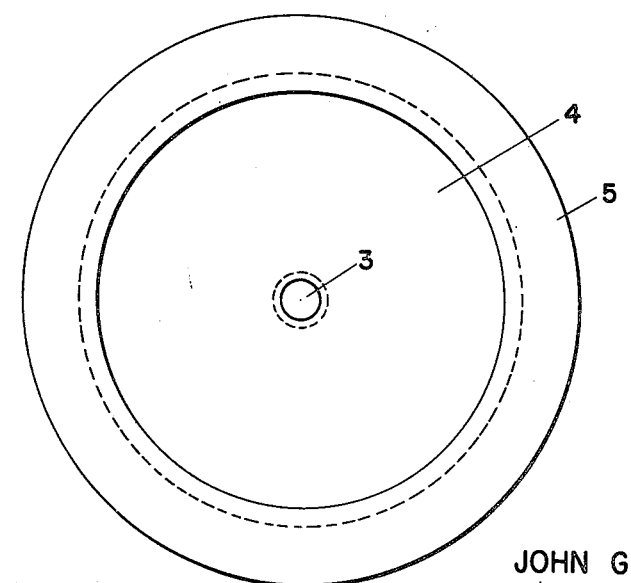
Figure 2 is a plan view of the nutation damper.

The gyro involves a motor 1 driving fly wheel 2. There is a shaft extended outwardly from and fixed to the frame of the motor in the spin axis of the gyro, but not rotating. This extension is referred to by reference character 3. Mounted upon this extension at a point removed from the center of nutation is a nutation damper which is the subject of the present invention. As shown in particular in Figure 2, the nutation damper involves a circular disc 4 of rubber, synthetic rubber or like elastic material having the characteristic of high internal friction. This damping disc 4 is mounted snugly on the shaft 3 and inertia member 5 rides upon the disc. Ring 5 may be secured to or merely a tight fit on disc 4. The inertia member will be of such weight in comparison to the size of the gyro that it will establish a mass remaining comparatively stable. When nutation is initiated the material of disc 4 will thus tend to be rapidly compressed and released when the shaft extension 3 wobbles. Energy will be absorbed by this alternate compression and release of the elastic material and thus the cause of nutation will be dissipated as heat due to internal friction in the material of disc 4.

Obviously the exact forms of the elements are susceptible of various embodiments other than the specific forms illustrated so long as the principle involved is adhered to. The device will be symmetrical about the spin axis and its mass and location designed with the requirements for a neutral gyro in mind.

I claim:

In combination in a gyroscope, a rotor assembly and a slator assembly including a frame, a shaft fixed to said frame and extending along the spin axis away from said frame, said shaft being of small diameter and only a fraction of the diameter of said frame, and a damper fixed to said shaft, said damper consisting of a disc of rubber-like material fixedly attached coaxially to said shaft, said disc having the characteristic of high internal friction and being of large radial dimension several times as great as its axial dimension, the outer diameter of said disc being about the same as the outer diameter of said frame, and an inertia ring fixedly attached coaxially to the periphery of said disc.

References Cited in the file of this patent
UNITED STATES PATENTS

| | | |
|---|---|---|
| 1,525,717 | Butz | Feb. 10, 1925 |
| 1,867,686 | Tibbetts | July 19, 1932 |
| 2,312,822 | Julien et al. | Mar. 2, 1943 |
| 2,411,550 | Lynn et al. | Nov. 26, 1946 |
| 2,412,453 | Grimshaw | Dec. 10, 1946 |

FOREIGN PATENTS

| | | |
|---|---|---|
| 389,065 | Great Britain | June 1, 1931 |
| 574,585 | Great Britain | Jan. 11, 1946 |